W. A. HARRISON.
HORSESHOE.
APPLICATION FILED MAY 18, 1914.
1,125,522.
Patented Jan. 19, 1915.
3 SHEETS—SHEET 1.
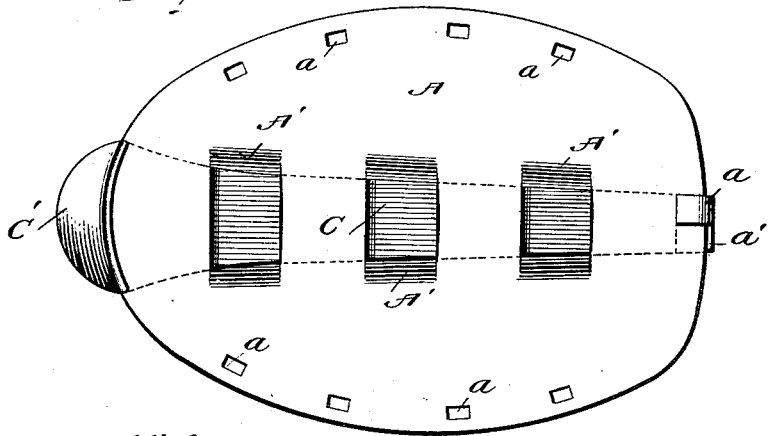
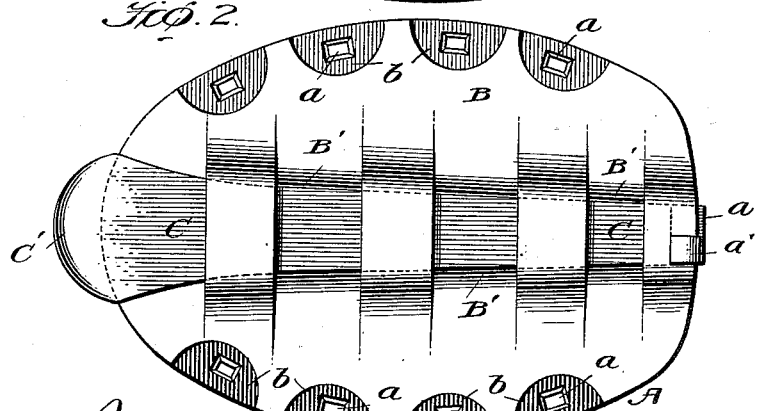
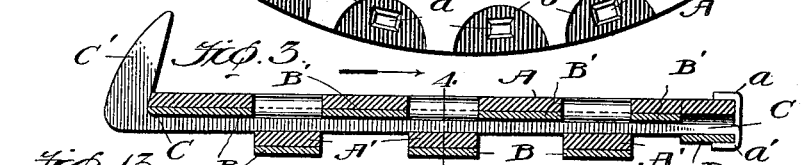
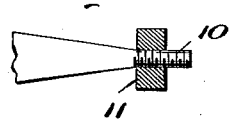
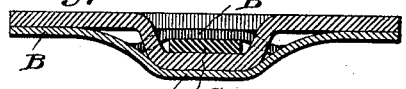
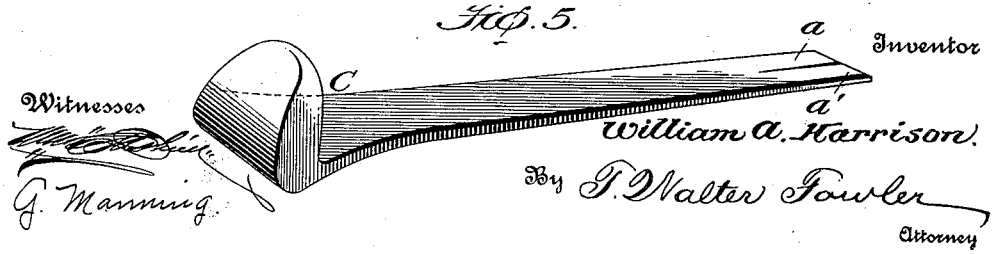

W. A. HARRISON.
HORSESHOE.
APPLICATION FILED MAY 18, 1914.
1,125,522.
Patented Jan. 19, 1915.
3 SHEETS—SHEET 2.
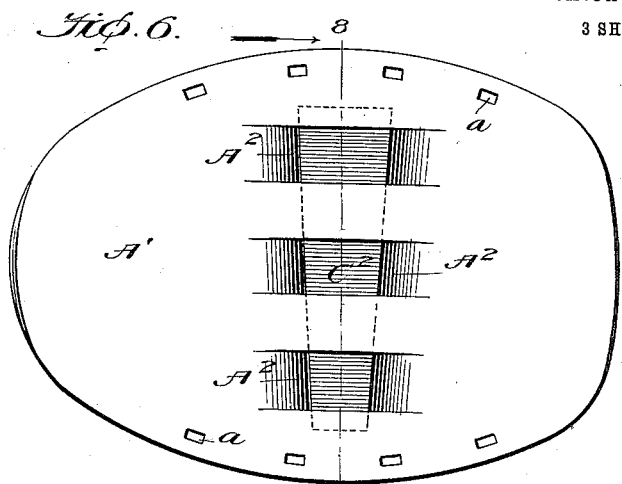
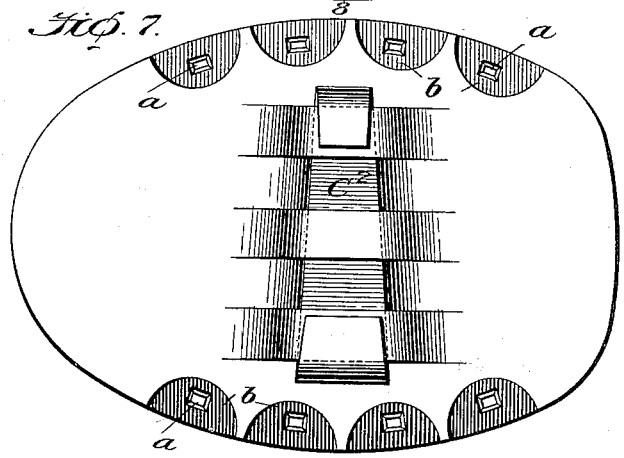
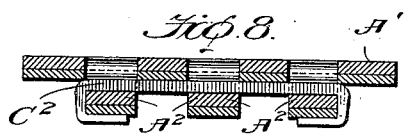
Inventor
William A. Harrison
By T. Walter Fowler
Attorney
Witnesses
G. Manning W. A. HARRISON.
HORSESHOE.
APPLICATION FILED MAY 18, 1914.
1,125,522.
Patented Jan. 19, 1915.
3 SHEETS—SHEET 3.
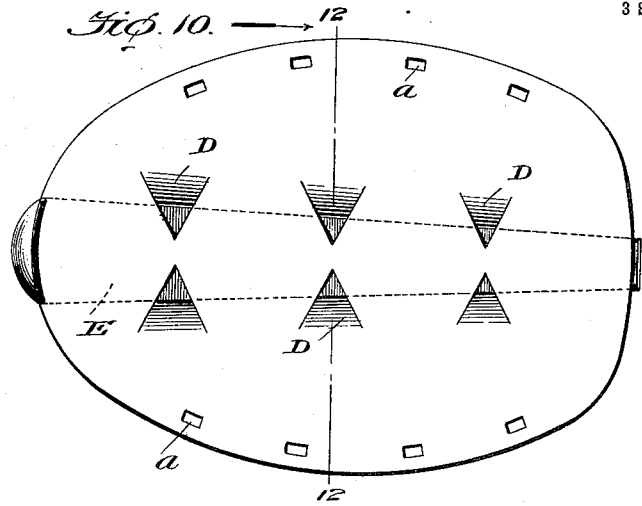
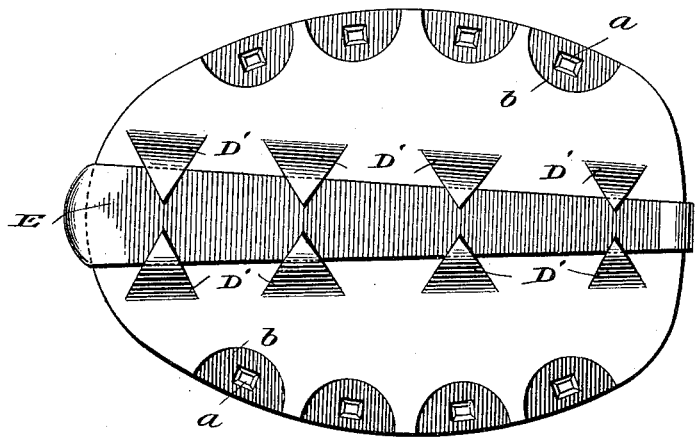
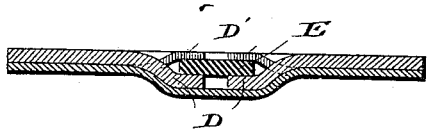
Inventor
William A. Harrison,
By T. Walter Fowler
Attorney
Witnesses
G. Manning.

UNITED STATES PATENT OFFICE.

WILLIAM A. HARRISON, OF NEW YORK, N. Y.

HORSESHOE.

1,125,522.  Specification of Letters Patent.  Patented Jan. 19, 1915.

Application filed May 18, 1914.  Serial No. 839,295.

*To all whom it may concern:*

Be it known that I, WILLIAM A. HARRISON, a citizen of the United States, residing at New York city, in the county of New York and State of New York, have invented certain new and useful Improvements in Horseshoes, of which the following is a specification.

My invention relates to certain new and useful improvements in horse shoes and particularly to that type of shoes employing what is known as the auxiliary tread-plate, which is designed to be removably attached to a part of the shoe which is permanently secured to the hoof, and my invention consists of the parts, and the constructions, arrangements and combinations of parts which I will hereinafter describe and claim.

In the accompanying drawings forming a part of this specification, and in which similar reference characters indicate like parts in the several views—Figure 1 is a top plan view of a horse-shoe embodying the salient features of my invention. Fig. 2 is a bottom plan view. Fig. 3 is a longitudinal sectional view on the line X—X of Fig. 1. Fig. 4 is a detail of the locking plate or key. Fig. 5 is a cross-sectional view on the line 4—4. Figs. 6 and 7 are reverse plan views of a shoe of modified form. Fig. 8 is a cross sectional view on the line 8—8 of Fig. 6. Fig. 9 is a perspective view of the locking key of Figs. 6 and 7. Figs. 10 and 11 are reverse plan views of a shoe of still further modified form. Fig. 12 is a cross sectional view on the line X—X of Fig. 10. Fig. 13 shows another method of securing the locking key.

In my shoe, the permanent section, A, namely, that portion of the shoe which is designed to be permanently attached to the hoof has the general configuration of the ordinary horse shoe, in that its exterior shape conforms substantially to the shape of the hoof. The permanent section, A, may be formed by drop-forging, casting, or otherwise, from a single piece of metal, or other suitable material, and between the heel and toe portion and adjacent the outer edge, suitable holes, *a*, are made for the reception of the nails which are designed to secure said section to the hoof.

The section, A, is slitted transversely or otherwise, and the slitted portions upset or bent outwardly so that they extend a slight distance below the lower face of the section to form a plurality of projections or loops, A', of which there may be any desired number and which may be done without substantially altering the upper face of the section or that part which fits against the hoof and which part is substantially straight transversely and longitudinally. When the section is cast, the projections or loops will be formed during the casting operation, as will be readily understood.

Co-acting with the permanent plate, is the auxiliary tread-plate, B, which may be formed in any desired manner and from any suitable material, metal or otherwise. In size, the auxiliary tread-plate, B, substantially corresponds to the permanent plate and its marginal edge substantially conforms to the contour of the corresponding edge of the permanent section, except that I prefer to recess or notch the edge of the auxiliary tread-plate at points, *b*, underlying the nail-holes of the permanent section so as to expose and give access to the heads of the nails which are used to secure the permanent section to the hoof. This is desirable because in the event of a nail working loose or having to be replaced because of some defect, the head of the nail may be exposed through the corresponding notch or recess so as to be engaged by a pair of nippers, or other tool for withdrawing the nail, the said recess or notch also enabling the new nail to be inserted and driven into the hoof in the manner well known in this art.

The character of material used for the auxiliary plate is immaterial except that it should preferably be of some tough material, metal or otherwise, which will act as a satisfactory anti-slipping surface or tread for the shoe. This tread-plate when formed of a sheet of material is slitted transversely, or otherwise, and the slitted portions bent toward the underside of the permanent section so as to form projections or loops, B', which alternate with and extend oppositely to the projections or loops which are formed on the bottom of the permanent section, whereby the eyes or openings in the several projections or loops are in line or register one with the other to form a continuous keyway or opening extending from the heel to the toe portion of the shoe, or from side to side of the shoe, said projections or loops being so related that a projecting or loop portion of the auxiliary tread-plate lies intermediate of a pair of projections or loops which are formed on, or struck out from, the bottom of the permanent section, and a projecting or loop-portion of the tread-section lies immediately under a tread portion intermediate of a pair of projections or loops which are struck out of, or formed on, the bottom of the permanent section. This arrangement provides for the alinement or register of the opening through or between the several projections or loops of both the permanent section and the auxiliary tread section and makes it possible for me to use a locking key or plate which will extend throughout the length of the sections A and B, thereby making a quick-detachable connection for the shoe.

The means which I prefer for locking the sections of the shoe together consists of a flat key or plate, C, of sufficient thickness and strength to answer the desired purpose. This plate may have a slight taper from the front to the rear and at the rear end the plate may be slitted to form tongues, $a$, $a'$, one of which, $a$, is adapted to be bent in one direction under the heel portion of the auxiliary tread-plate so that it will lie next to the ground when in use and there will be no danger of the tongue being straightened out or otherwise unfastened, the other tongue, $a'$, of the locking key or plate is designed to be bent upwardly so as to fasten over the edge of the heel of the permanent section. By this means the key is locked to each of the sections and in turn locks the sections to each other so that the shoe is a rigid two-part shoe having a detachable tread section.

At the front end, when the construction of Fig. 1 is used, the locking key or plate is turned upwardly and thickened to form the usual toe clip, $C'$, the purpose of which is well understood.

In applying the shoe to a hoof, the permanent section is nailed to the hoof in the usual manner, and the auxiliary tread-section is placed over the permanent section so that the projecting or loop-portion of one section fits between adjacent projecting or loop portions on the other section, and the locking key or plate is inserted from the front and passed through the key-way formed by the several alined loops or projections and until the toe-clip comes squarely against the front of the hoof. The tongues, $a$, $a'$, which are formed by slitting the rear end of the key or plate are then bent, as described, thereby locking the key in place and holding the sections rigidly together.

From this description it will be readily understood that a tread-plate such as I have described may be quickly fitted to the permanent section of the shoe by anyone and without requiring the assistance of a skilled blacksmith, and that when it is desired to remove the tread-plate for the purpose of installing a new one, the locking key or plate may be quickly removed by driving a wedge or tool behind the toe clip and by bending the tongues at the rear of the key so that they will be substantially straight, when the key may be quickly drawn out of locking engagement with the loops of the two sections, thus separating the auxiliary tread-plate from the permanent section, after which another and corresponding auxiliary tread-plate may be fitted to the permanent section in the manner before described and the key again inserted and locked as before described.

While I have heretofore described the permanent section and the removable tread-plate as being slitted transversely, and the loops or projections struck out from opposite portions of the plate and section, to be engaged by the locking key, it is quite apparent that this construction is subject to material modification. For instance, in Figs. 6, 7, the permanent section, $A'$, of the shoe is slitted longitudinally and the projections or loops, $A^2$, form a key-way which extends longitudinally of the shoe, while the locking key or plate $C^2$, extends transversely of the shoe. In this instance, one or both of the ends of the key or plate may be bent under the outermost projections or looped portions of the tread-plate and be presented next to the ground so that the weight of the horse will tend to maintain these turned over portions in their bent position. So far as the formation of the projections or loops is concerned, said projections or loops may extend in any desired direction and there may be any number of them without departing from the spirit of my invention. Also, in Figs. 10–11, I show a modification wherein the loops are dispensed with, but an equivalent construction is provided. In this case, I employ tongues D, D', which may be formed integral with the permanent section and tread-plate, respectively, in any desired manner these tongues projecting beyond the adjacent faces of the sections sufficiently and in alternate relation to provide the key-way for the locking key, or plate, E, to thereby lock the tread-plate and permanent section in substantially the manner before described.

Other modification of the foregoing shoes may be employed within the scope of the invention so long as the salient features of co-acting parts on a permanent section and a removable tread-plate are so related as to be engaged by a locking member which in itself is readily removable to effect the ready detachment and installation of the aforesaid tread-plate.

If desired, and as a substitute for the slitting and bending of the securing end of the key or plate, said key or plate may have a reduced threaded end, 10, to receive a nut, 11, as shown in Fig. 13.

Having thus described my invention what I claim as new and desire to secure by Letters Patent is:

1. A horse shoe comprising a permanent section adapted to be secured to a hoof and an auxiliary tread-section detachably fitted to said permanent section, said sections each having a plurality of projecting parts forming a key-way therebetween, and a key slidably engaging the projections of both sections, and locking the sections together.

2. A horse shoe comprising a permanent section adapted to be secured to a hoof, and an auxiliary section detachably fitted to the permanent section, said sections having projecting parts forming a key-way and the projections on one section alternating with those on the other section, and a key slidably engaging the projections of both sections and locking the sections together.

3. A horse shoe comprising a permanent section adapted to be secured to a hoof, and an auxiliary section detachably fitted to the permanent section, said sections having projecting parts forming a key-way and the projections on one section alternating with those on the other section, a key slidably engaging the projections of both sections and locking the sections together, and means for holding the key in locking position on the shoe.

4. A horse shoe comprising a permanent section adapted to be secured to a hoof and an auxiliary section detachably fitted to the permanent section, said sections having projecting parts forming a key-way and the projections on one section alternating with those on the other section, and a key slidably engaging the projections of both sections and locking the sections together, said key having a part adapted to be bent into engagement with a part of the shoe to thereby retain the key in place.

5. A horse shoe comprising a permanent section adapted to be secured to a hoof and having loop-portions projecting from the underside, an auxiliary tread-section having loop-portions fitting between adjacent loop-portions of the permanent section, the eyes or openings in several loops being in register, a locking key extending through the loops of the sections, and means for locking the key in place.

6. A horse shoe comprising a permanent section adapted to be secured to a hoof and having loop-portions projecting from the underside, an auxiliary tread-section having loop-portions fitting between adjacent loop-portions of the permanent section, the eyes or openings in the several loops being in register, a locking key extending through the loops of the sections, and means for locking the key in place, said key having a toe-clip at its front end.

7. A horse shoe comprising a permanent section adapted to be secured to a hoof and having loop-portions projecting from the underside, an auxiliary tread-section having loop-portions fitting between adjacent loop-portions of the permanent section, the eyes or openings in the several loops being in register, a locking key extending through the loops of the sections, said key having means for locking it in place, and said key being tapered from front to rear and having a thickened toe-clip at the front end.

8. A horse shoe comprising a permanent section adapted to be secured to a hoof and having loop-portions projecting from the underside, an auxiliary tread-section having loop-portions fitting between adjacent loop-portions on the permanent section, the eyes or openings in the several loops being in register, and a locking-key extending through the loops of the sections, said key having a split rear end forming tongues which are bent in opposite directions over the heel portion of said sections.

9. A horse shoe comprising a permanent and a removable section each having loops struck out from adjacent faces with a loop of one section fitting between a pair of loops on the other section so as to bring the openings through the loops in register, and a quick-detachable key extending from toe to heel of said sections and passing through the loops thereof, said key having a toe-clip at the front end and having the rear end engaging both of said sections.

10. A horse shoe comprising a permanent and a removable section each having loops struck out from adjacent faces with a loop of one section fitting between a pair of loops of the other section so as to bring the openings through the loops in register, and a quick-detachable key extending from the toe to heel of said sections and passing through the loops thereof, said key having a toe-clip at the front end and having the rear end engaging both of said sections, said permanent section provided with nail holes and the edge of the auxiliary tread section having recesses registering with said holes and affording access to the heads of securing nails.

In testimony whereof I affix my signature in presence of two witnesses.

WILLIAM A. HARRISON.

Witnesses:
T. W. FOWLER,
C. W. FOWLER.